2 Sheets—Sheet 1.

J. J. GREENOUGH.

Circular-Loom.

No. 8,952. Reissued Nov. 4, 1879.

N. PETERS, PHOTO-LITHOGRAPHER, WASHINGTON, D. C.

J. J. GREENOUGH.
Circular-Loom.

No. 8,952. Reissued Nov. 4, 1879.

*Attest.*

Samuel T. Jones

J. W. Maxwell

*Inventor.*

John James Greenough

N. PETERS, PHOTO-LITHOGRAPHER, WASHINGTON, D. C.

UNITED STATES PATENT OFFICE.

JOHN JAMES GREENOUGH, OF SYRACUSE, NEW YORK.

IMPROVEMENT IN CIRCULAR LOOMS.

Specification forming part of Letters Patent No. 51,040, dated November 21, 1865; Reissue No. 8,952, dated November 4, 1879; application filed December 6, 1876.

*To all whom it may concern:*

Be it known that I, JOHN JAMES GREENOUGH, formerly of the city of New York, now residing in the city of Syracuse, in the State of New York, did invent certain new and useful machinery for weaving cloth, which I denominate a "Circular Loom," parts of which are applicable to other looms, or varied, as herein more fully set forth.

The accompanying drawings illustrate the novel features of said loom, and are referred to by letters in the description.

Figure 1:
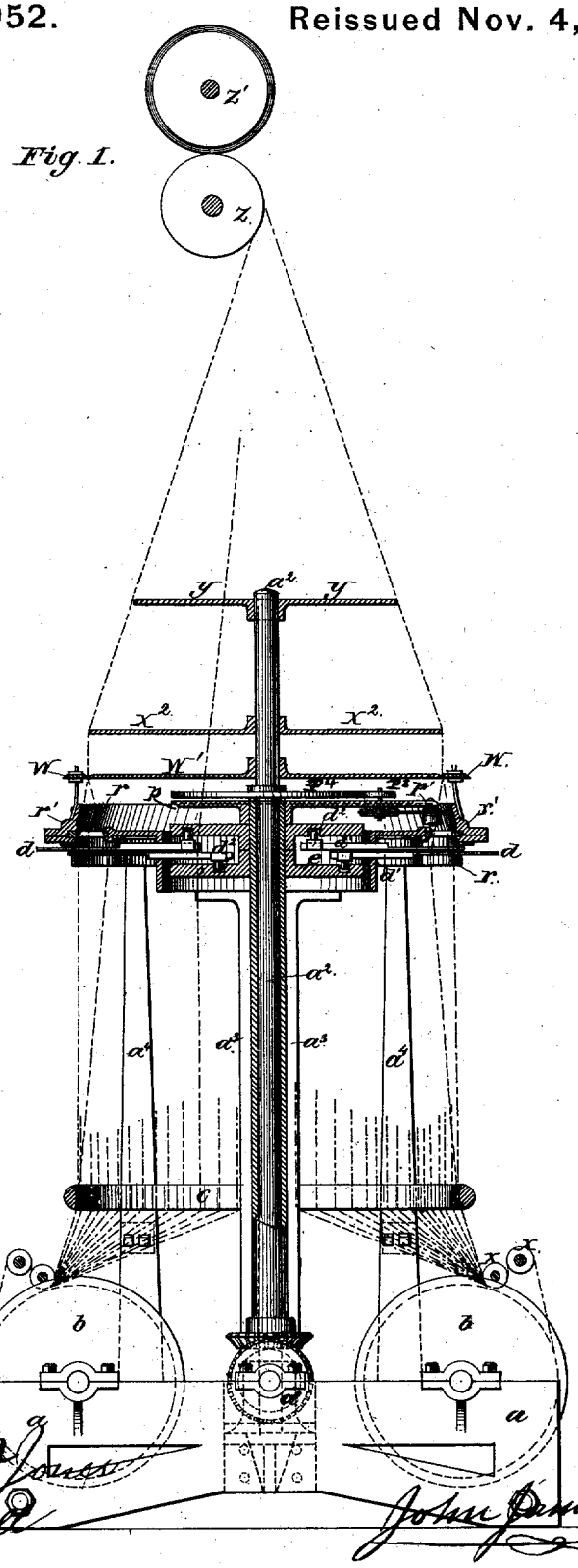
Figure 2:
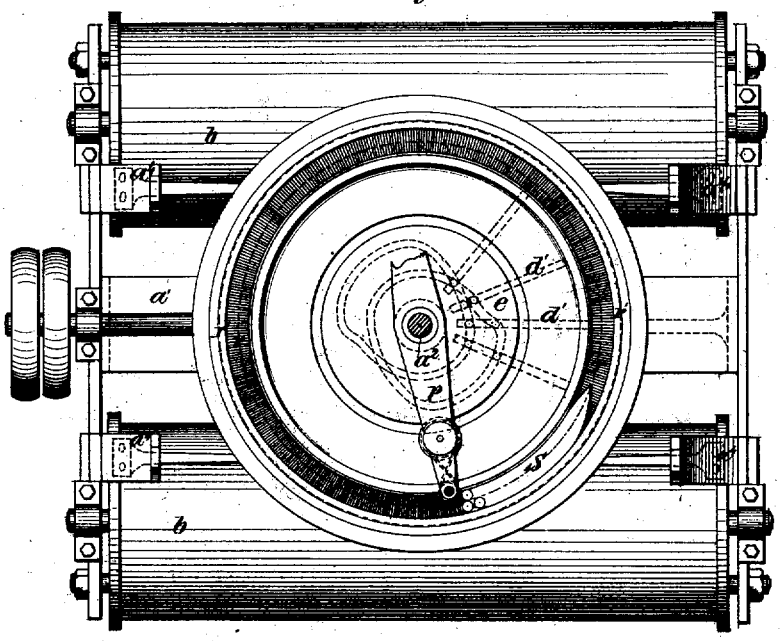
Figure 3:
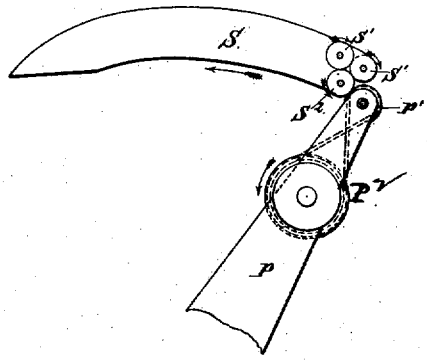
Figure 4:
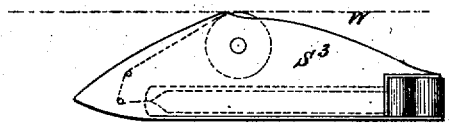
Figure 5:
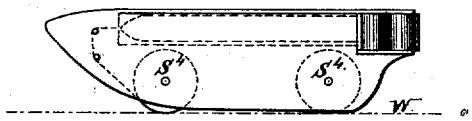
Figure 6:
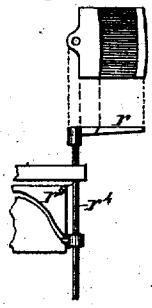

Figure 1 represents a vertical section of the loom; Fig. 2, a plan from above the circular race; Fig. 3, plan of shuttle and end of driving-arm; Fig. 4, elevation of a shuttle running below the woven cloth; Fig. 5, modified shuttle running over the line of woven cloth; Fig. 6, device for beating up with sections of the reed.

My loom is composed of the following devices: a circular race, in which two or more shuttles detached from the driver are made to run continuously within and entirely surrounded by the warp while weaving in one direction, laying the weft or filling properly into place in the warp, and weaving the cloth in tubular form; also, devices for driving the shuttle, by which all disturbance of the warp-threads laterally is prevented; also, devices for determining the breadth or circumference of the woven cloth; also, the beating up thereof.

Several parts are susceptible of modification in construction, and may be advantageously used in other looms. Throughout the following description I shall name some of the most prominent of these modifications for illustration, and as types of the changes I deem equivalents of the devices shown in the drawings.

It is obvious that the frame of the machine may be made in any convenient way that will sustain the working parts.

In the drawings, $a$ represents an oblong base of metal, consisting of two side castings connected by a cross-piece, $a'$, through the center, and by other braces at the ends. From the center of the cross-piece $a'$ a standard, $a^2$, rises, forming the axis of the revolving tubular center shaft, above which it supports certain stationary parts of the loom.

Standards $a^3$ sustain the stationary parts below and the race-ring within the web. The standards $a^4$ support the outer race-ring, $r'$, and other parts outside the web. The take-up cylinders $z$ $z'$ may be supported on standards (not shown) or by hangers from above. These parts may be varied in their details by any competent loom-maker to properly support the working parts.

The warp may be wound on a straight beam, (I prefer to use two or more, as seen at $b$ in the drawings;) or, instead thereof, creels of spools can be substituted for the warp-beams, as is well known to weavers. The warp-threads from the beam or creel are led up around a circle at ring $c$ after passing a tension apparatus at $x$, and thence up through the reed $r$ above.

The tension apparatus may be a weight or other sufficient device suited to the work, which, while it keeps a proper strain upon the warp, allows it to rise freely in a wave as the shed is opened without additional strain on the warp.

The harness or heddles, preferably needles $d$, as in the drawings, are located as close as they can conveniently be to the reed $r$, to open the warp the least possible distance. They are connected with shanks $d'$, on which are pins $d^2$, that work in a groove-cam, $e$, on the center tubular shaft, by which they are moved. The cams $e$ are so formed as to open the shed gradually from near the heel of one shuttle to the point of the succeeding one, so that when the loom is in very rapid motion the opening of the shed is made without any sudden jerk and at a minimum velocity.

To make the loom simple, for plain cloth, the shuttles must be in pairs. In twills, the number of the shuttles must equal the number of the leaves of twill, or a multiple thereof, in which case the cams $e$ revolve uniformly with the shuttles; otherwise they could not do so.

The shuttle $s$ is curved in its outline to conform to the curve of the race. In Fig. 3 it is shown with three rollers, two of which, $s'$ $s'$, run against the outer curb of the race $r'$. Roller $s^2$ bears upon the periphery of the others, and revolves with them.

On a driver, $p$, projecting out to the shuttle-race from the center shaft, a driving-roller, $p'$, is pivoted, that comes in contact with the roller $s^2$ behind its axis, so as to drive the shuttle onward in the race $r$. This roller $p'$ is made to revolve on its axis, as it is advanced by arm $p$, by any convenient and sufficient mechanism that shall give it positive and independent motion backward at the driving-point, so as to pass over the warp-threads between the shuttle-roller $s^2$ and said roller $p'$ without dragging said warp-threads laterally out of place—a point of vital importance in driving shuttles inside the warp by a driver on the outside. In the drawings, Figs. 1 and 3, the device shown for this purpose is a small round cross-band running in a groove above the driving-point on driving-roller $p'$, that connects it with a pulley, $p^2$, below the arm $p$ nearer the center.

The shaft on which pulley $p^2$ is affixed and with which it turns extends up through arm $p$, and bears on its upper end a friction-pulley, $p^3$, that is in contact with the periphery of a stationary disk or wheel, $p^4$, affixed to the center stationary shaft, $a^2$, so that as the arm $p$ sweeps around the center the pulley $p^3$ will be revolved by its contact with it, and turn the driving-roller $p'$ in the proper direction and with the requisite velocity, so as not to disturb the warp with which it comes in contact. The movements of the rollers are indicated by arrows in Fig. 3.

When the shuttles are made to beat up or properly lay in the filling, they are made with a projecting pin, $s^3$, with a wheel therein that runs along the line of woven cloth, as seen in Fig. 4, in which the shuttle is below, weaving upward. In Fig. 5 it is above, weaving downward.

Should the reed be required to beat up with, its dents can be divided into sections or a convenient number of dents, and each section can be raised by means of a cam, $r^5$, actuating a rod, $r^4$, affixed to the sections. (See Fig. 6.)

At the line where the filling is laid in I place a ring, $w$, of the circumference the woven cloth is to be, and against which the warp-threads bear. This ring $w$ should be smaller than the circle of warp-threads at the point $c$, and the greater the difference between the size of these two circles the more room will there be for the play of the harness and the spread of the warp-threads, which should be varied according to circumstances that will readily be suggested to the practical manufacturer. A disk, $w'$, is also shown in the drawings at this point, fixed to the center standard, $a^2$. Between these there is a narrow space, through which the cloth as it is woven passes.

The disk $w'$ should have an elastic edge, of proper material, that presses upon the cloth between it and the outer ring, $w$.

The beat-up rollers in the shuttles run in the space above named, by which they are steadied and guided and the strain upon the warp-threads is greatly relieved. As the cloth is woven it passes over the circular disk $x^2$, and thence to an oval one, $y$, affixed stationary to standard $a$, and thence it spreads out flat and runs over the take-up roller $z$, and is wound on the cloth-beam $z'$.

The let-off and take-up motions differ from those of ordinary looms principally in being continuous, instead of intermittent, the motion being given by any well-known means not necessary to describe.

It is obvious that the shuttle can be driven from outside the race, and that elastic flexible bands can be placed on both sides of the race and forced in behind the shuttle to drive it; but I do not prefer it to the one described. So where the force required to drive the shuttle is within the limits of magnetic attraction the shuttle may be formed of iron or steel, and a magnet or electro-magnet may be affixed to the driver, and draw the shuttle around the race by its attraction.

The tube of woven cloth can be split lengthwise in one or more places, thus dividing it into the widths desired, and each piece can be wound onto separate cloth-beams.

Any desired number of shuttles can be used at the same time, all weaving, limited only by the length of the race to admit them, with space sufficient between them to change the warp-shed for the style of goods woven.

In the above-described devices, I claim—

1. The shuttle-driver consisting of a roller, $p'$, and its carrier $p$, together with the mechanism for imparting to said roller a positive independent rotary motion on its own axis as it is moved along the race, substantially as and for the purposes set forth.

2. In a loom for weaving circular fabrics, the combination, with the shedding mechanism and the devices for carrying the filling-thread, of a ring, $w$, for determining the circumference of the woven-cloth tube, substantially in the manner specified.

3. In a loom for weaving circular fabrics, the combination, with the shedding mechanism and devices for carrying the filling-thread, of a ring, $w$, and disk $w'$, between which the cloth is woven, as and for the purposes set forth.

4. In a loom for weaving circular fabrics, the combination, with shedding and weft-inserting mechanism, of the ring $w$ and means for holding the warp distended in form of a circle the circumference of which is greater than that of a circle at the weaving-point, whereby the warp-threads are kept in contact with the inner edge of the said ring $w$, as and for the purposes specified.

5. The combination, with a shuttle, of a circular race and a ring, $w$, for the purpose of beating up the filling, substantially as herein described.

JOHN JAMES GREENOUGH.

Witnesses:

LAURENCE T. JONES,
J. W. MAXWELL.